(12) United States Patent
Castellan

(10) Patent No.: US 12,552,306 B2
(45) Date of Patent: Feb. 17, 2026

(54) DEVICE FOR SALVAGING A MOTOR VEHICLE

(71) Applicant: Castellan AG, Kreuztal (DE)

(72) Inventor: Stefan Hans-Georg Castellan, Kreuztal (DE)

(73) Assignee: Castellan AG, Kreuztal (DE)

( * ) Notice: Subject to any disclaimer, the term of this patent is extended or adjusted under 35 U.S.C. 154(b) by 416 days.

(21) Appl. No.: 18/271,065

(22) PCT Filed: Dec. 22, 2021

(86) PCT No.: PCT/EP2021/087217
§ 371 (c)(1),
(2) Date: Jul. 6, 2023

(87) PCT Pub. No.: WO2022/148652
PCT Pub. Date: Jul. 14, 2022

(65) Prior Publication Data
US 2024/0075865 A1    Mar. 7, 2024

(30) Foreign Application Priority Data
Jan. 7, 2021    (DE) .............. 10 2021 100 136.6

(51) Int. Cl.
*B60P 3/12*    (2006.01)
*B60S 13/00*   (2006.01)

(52) U.S. Cl.
CPC ............. *B60P 3/12* (2013.01); *B60S 13/00* (2013.01)

(58) Field of Classification Search
CPC .. B60P 3/12; B60P 3/122; B60P 3/125; B60P 3/127; B60S 13/00; E04H 6/182
See application file for complete search history.

(56) References Cited

U.S. PATENT DOCUMENTS

| | | | | |
|---|---|---|---|---|
| 4,797,057 A | * | 1/1989 | Shoup ............... | B60P 3/125 280/402 |
| 4,993,910 A | * | 2/1991 | Rigg ................ | B60P 3/125 414/463 |
| 5,853,276 A | * | 12/1998 | Buch ............... | B60S 13/00 414/427 |
| 6,443,685 B1 | * | 9/2002 | Maeno ............ | B60P 3/12 280/402 |
| 10,590,669 B2 | | 3/2020 | Boussard et al. | |
| 2007/0098536 A1 | * | 5/2007 | Kooima ........... | B60P 3/125 414/563 |
| 2013/0243563 A1 | * | 9/2013 | Piercey, III ...... | B60P 3/122 414/813 |

FOREIGN PATENT DOCUMENTS

| | | |
|---|---|---|
| AU | 2009230812 A1 | 2/2011 |
| DE | 102016211854 B3 | 8/2017 |
| DE | 102017010960 A1 | 5/2019 |
| EP | 3263402 A1 | 1/2018 |

* cited by examiner

*Primary Examiner* — Kaitlin S Joerger
(74) *Attorney, Agent, or Firm* — Smartpat PLC

(57) ABSTRACT

A device (1) for salvaging a motor vehicle involved in an accident, in particular a burning motor vehicle (12), from a danger zone has an extendable telescopic cylinder (2), at the tip of which at least one catch (5) is attached so that it can be folded in such a way that the motor vehicle (12) is carried along when the device (1) is pulled back.

9 Claims, 4 Drawing Sheets

DEVICE FOR SALVAGING A MOTOR VEHICLE

CROSS-REFERENCE TO RELATED APPLICATION

This application is a national stage application, filed under 35 U.S.C. § 371, of International Patent Application PCT/EP2021/087217, filed on Dec. 22, 2021, which claims the benefit of German Patent Application DE 10 2021 100 136.6 filed on Jan. 7, 2021.

TECHNICAL FIELD

The disclosure relates to a device for salvaging a motor vehicle that has been involved in an accident, in particular a burning motor vehicle, from a danger zone. Such devices are used with wrecked and burning motor vehicles, in particular electric or hybrid vehicles, so that they can be pulled safely and as riskless as possible out of a danger area that may not be accessible with extinguishers by the rescue services, so that the fire can then be extinguished, for example

BACKGROUND

The term "wrecked" is understood in particular to mean that the motor vehicle is so badly damaged and/or has become unusable in such a way that it can no longer be easily moved, for example after an accident, due to mechanical damage and/or in particular due to fire.

DE 10 2016 211 854 B3 proposed a container for salvaging wrecked electric or hybrid vehicles, which is designed as an interchangeable container, a so-called roll-off container. A swap body vehicle can pick up this roll-off container and transport it to the scene of the accident. A burning motor vehicle can be pulled into the roll-off container via a side opening by means of a cable winch, the end-side hook element of which engages in an eyelet-like attachment means of a lashing strap placed around the burning motor vehicle. After closing the opening, coolant or extinguishing agent is introduced into the roll-off container so that the motor vehicle is flooded so that the fire can be extinguished, and the defective accumulator can be cooled until self-ignition is no longer possible. Regular water for extinguishing fires is used as cooling and/or extinguishing agent.

However, such a roll-off container is very bulky and requires a lot of space to be parked using a swap body vehicle, so that it cannot be used everywhere and especially not in buildings such as multi-story car parks or garages. When it is used and in particular when the lashing strap is put on around the burning motor vehicle, the rescue worker has to get very close to the scene. Not least for safety reasons, this represents a risk for the persons concerned.

DE 10 2017 010 960 A1 discloses a device for salvaging wrecked electric vehicles, in which wrecked motor vehicles are pulled into a container using a loading device. The container can be moved towards the wrecked motor vehicle by means of a displacement device. Thereby, a wrecked motor vehicle can be relocated to the container autonomously and in particular automatically by means of the loading device. The loading device can be a cable winch with a gripping device.

For example, the cable winch can be attached to the towing eye of a motor vehicle, which can be extremely dangerous because the rescue worker has to reach the vehicle that may be on fire and hook the winch hook there.

According to EP 3 263 402 A1, however, lashing straps can also be placed around the motor vehicle, on which the cable winch is then hung. However, this can be life-threatening, especially in case of a burning motor vehicle.

SUMMARY

The disclosure is based on the object of designing a device that enables simple and safe salvaging of a motor vehicle which has been involved in an accident, in particular if it is on fire, with the rescue workers at a sufficient distance from the source of the danger.

The object is achieved by a device as described and claimed.

The device has an extendable telescopic cylinder, at the tip of which a movable platform provided with wheels or rollers is arranged, that the platform holds at least one catch that can be moved from a rest position into a locking position, and that the catch can be brought into the locking position by remote control in the area of the motor vehicle, so that the motor vehicle is carried along when the device is pulled back.

This means that the rescue workers can keep a large distance from the burning motor vehicle during salvaging, can extend the telescopic cylinder from there, lock the catch on the vehicle by remote control and pull the motor vehicle out of the danger zone by retracting the telescopic cylinder.

It is advantageous that the platform can drive under the motor vehicle, and that a pin that can be moved by means of a hinge on the platform from its lying rest position into an upright locking position is provided as the catch.

After the platform has driven under the motor vehicle, the pin, which is initially lying on the platform, can be raised remotely. When the platform is pulled back, the pin, which is now standing up, takes the motor vehicle with it.

It has proven of value that the at least one catch can be moved out of the rest position by means of at least one spring.

A remote unlocking is provided for this purpose. However, it is also conceivable that the spring always tries to keep the pin upright. When driving under the motor vehicle, the pin would then be pivoted by the motor vehicle against the spring force towards the platform. Once the pin is upright again, the platform could be pulled back. This could not only happen after the motor vehicle has been driven under completely, but also when the pin comes to stand in a cavity under the vehicle.

However, it is also advantageous if a remote-controlled locking device holds the at least one catch in the rest position or in the locking position.

Alternatively, grippers or claws that can be moved from its open rest position into a closed locking position by means of a joint on the platform can be provided as a catch.

The claw can, for example, be closed in the area of at least one wheel of the motor vehicle in such a way that the tensile force on the device can be introduced into the motor vehicle via the grippers, so that the motor vehicle can be pulled out of the danger area.

It is advantageous that the telescopic cylinder is provided with carrying handles for transporting the device to the scene.

It has proven useful for the telescopic cylinder to have a fitting, by means of which a hydraulic hose for supplying a hydraulic fluid can be connected.

This allows the telescopic cylinder to be connected to a hydraulic rescue tool for operation.

It has proven to be advantageous that a towing eye for a cable winch or a manual cable hoist for retracting the device and the motor vehicle is attached to the end of the telescopic cylinder.

It is expedient if an actuating device for actuating the at least one catch is arranged along the telescopic cylinder.

Use is simplified if the actuating device is a cable pull to which an actuating means is attached.

There may also be advantages if a control at the rear handle end of the device determines the flow direction of the hydraulic fluid. This allows controlling whether the telescopic cylinder extends or contracts.

The invention is explained in more detail below with reference to exemplary embodiments illustrated in the drawing.

DETAILED DESCRIPTION

Figure 1:
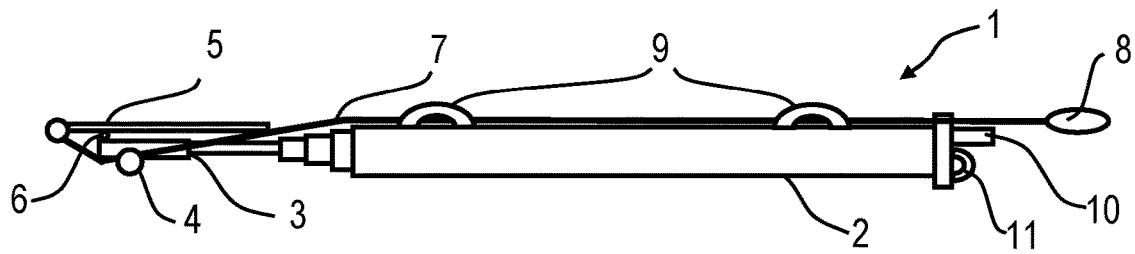
FIG. 1 shows a device for salvaging a motor vehicle in a rest state.

FIG. 1 shows an example of a device (1) for salvaging a wrecked, for example burning, motor vehicle, also referred to below as a salvage lance, which has a telescopic cylinder 2 in the form of a telescopic tube, which is shown in the retracted state. The telescopic cylinder (2) is preferably driven hydraulically, for example by water for extinguishing fires. Other linear drives, for example an electric linear drive, are of course also possible.

A platform 3 is attached at the tip of the telescopic cylinder 2, which can be designed in the form of a carriage or sled. In FIG. 1 the platform 3 is provided with wheels or rollers 4 for easier transport and movement. Barbs or catches 5 are foldably attached by means of a hinge 6 on the platform 3. In the case shown, the catches 5 are shown folded, lying, in rest position. An actuating device in the form of a cable pull 7 is fastened to the short end of the catches 5, which runs along the telescopic cylinder 2 by means of deflections, so that the catches 5 can be raised, i.e. brought into the locking position, by an actuating means 8, as is shown below with reference to FIG. 2. At the top of the telescopic cylinder 2 there are two handles 9 for transporting the salvage lance. The end of the telescopic cylinder 2 is provided with a fitting 10 through which a hydraulic fluid, preferably water such as water for extinguishing fires, can be supplied. Furthermore, at the end of the telescopic cylinder 2 there is a towing eye 11 for a cable winch or a manual cable hoist for pulling back the device 1 and the motor vehicle 12.

Figure 2:
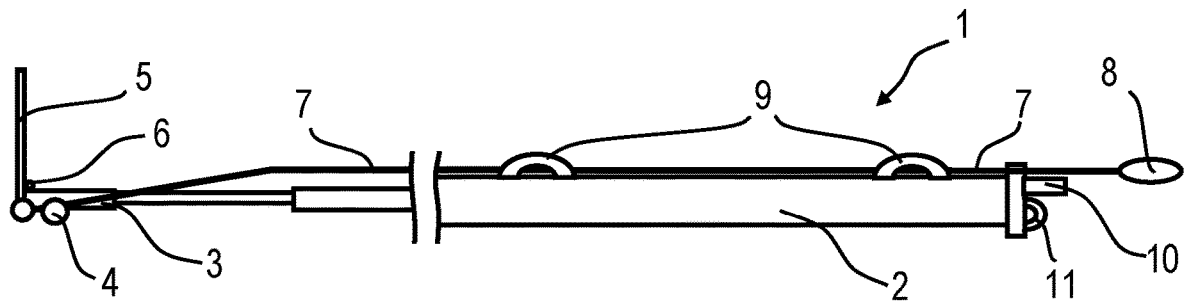
FIG. 2 shows the device according to FIG. 1 in a salvaging state.

In FIG. 2, the device 1 or salvage lance according to FIG. 1 is also shown in a side view but in the extended state, with the extended telescopic cylinder 2 being shown discontinuous for better illustration and comparison. In this case of the working position the catches 5 are shown folded up in the locking position. This locking position was reached by pulling on the actuating means 8 so that the cable pull 7 acting on the end of the catch 5 pivoted the catches 5 about the axis of the hinge 6 into the vertical.

Figure 3:
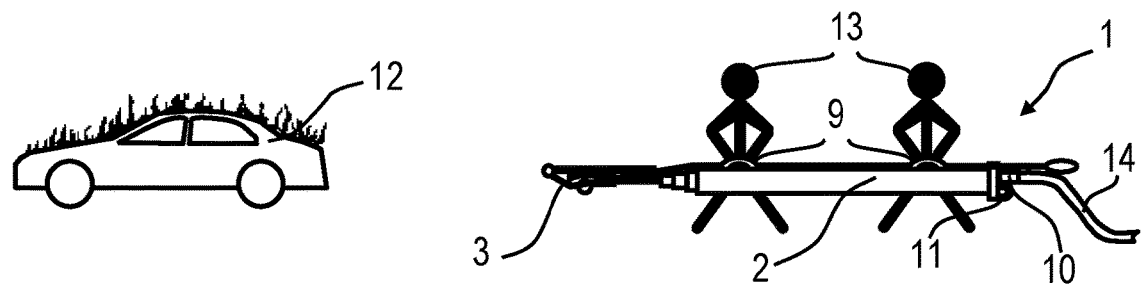
FIG. 3 shows the ready-to-use device according to FIG. 1
Figure 4:
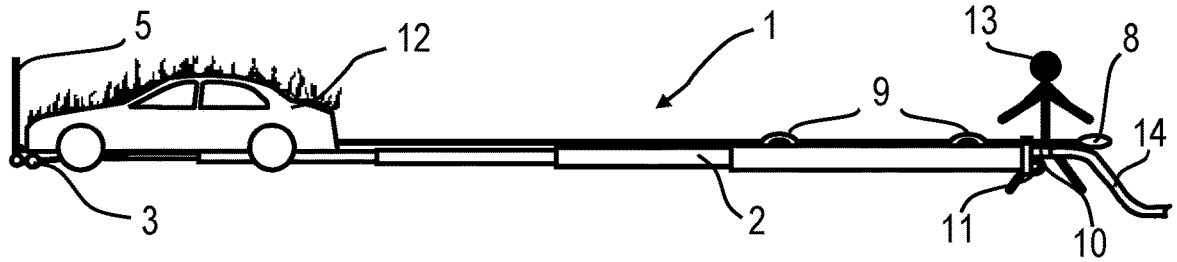
FIG. 4 shows the device according to FIG. 1 in use.

The functioning of the device 1 will now be explained in more detail with reference to FIGS. 3 and 4. If a wrecked, for example burning motor vehicle 12 is to be pulled out of a danger area, the salvage lance is carried by two or more firefighters 13 as rescue workers on the carrying handle 9 into the area of the motor vehicle 12 involved in the accident, here behind the motor vehicle 12 involved in the accident. There, a hydraulic hose 14 is then connected to the fitting 10, which is connected on the other side to a pump, for example in a fire engine (not shown). The telescopic cylinder 2 can then preferably be driven with the water for extinguishing fires present in the fire engine.

However, the telescopic cylinder 2 can also be connected to a hydraulic rescue tool. The hydraulic rescue tool is powered by a high pressure hydraulic pump. Since the pump and working tools are separate from each other, they are connected by hydraulic hoses. The hoses are often on reels for better handling. Optionally, an operating element with a corresponding control can be provided, via which it can be decided, if necessary, whether the salvage lance extends or retracts.

The telescopic cylinder 2 is extended by means of the liquid, with the platform 3 being pushed on the rollers 4 under the motor vehicle 12 until the catches 5 designed as swivel pins are completely in front of the burning motor vehicle 12. Then the catches 5 are raised by a fireman 13 by pulling on the cable pull 7. The device can then be pulled back, for example by means of a cable winch (not shown), which is hooked into the towing eye 11, with the catches 5 pulling the burning motor vehicle 12 out of the danger zone.

Figure 5:
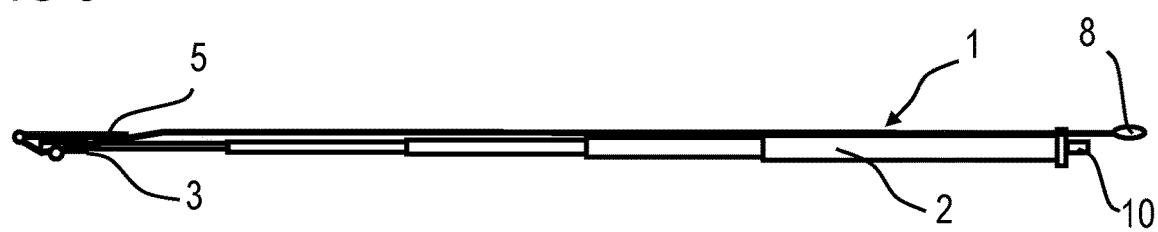
FIGS. 5 and 6 show two views of the device according to FIG. 1 ready for advance.
Figure 6:
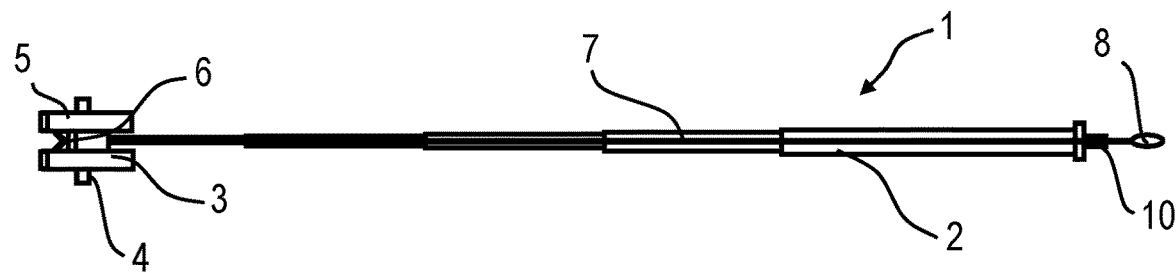

FIGS. 5 and 6 show the fully extended device 1 in a side view and top view with the catches 5 folded together, so that they are ready for use.

Figure 7:
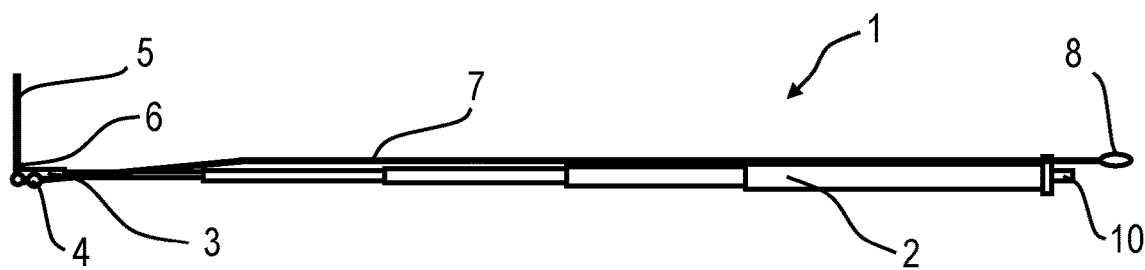
FIGS. 7 and 8 show two views of the device according to FIG. 1 ready for pull-back and salvaging operation.
Figure 8:
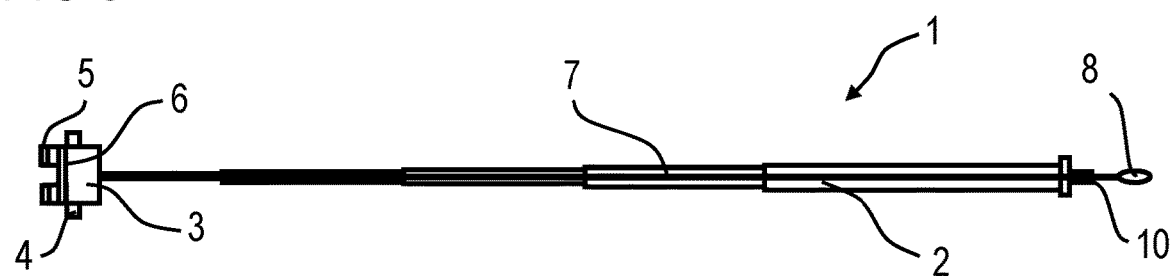

FIGS. 7 and 8 now show the fully extended device 1 in a side view and top view with the catches 5 folded up and ready for use, so that they could pull the burning motor vehicle 12 out of the danger zone.

Figure 9:
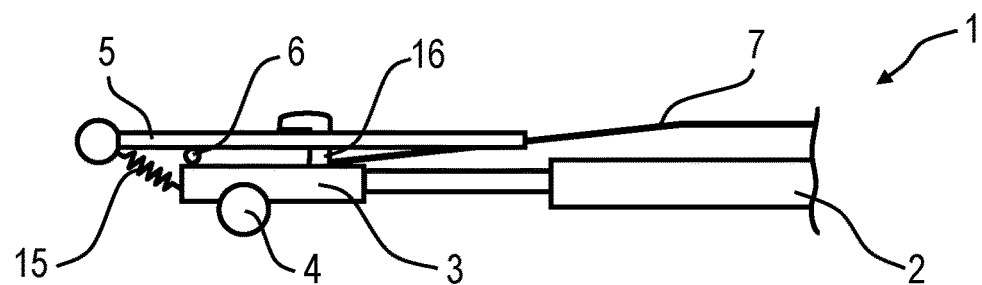
FIG. 9 shows an alternative embodiment of the device.

FIG. 9 shows an alternative embodiment of the device according to the invention, in which the platform 3 is provided with a locking device, for example a locking hook 16, for the catches 5, which keeps the catches 5 in the rest position against the force of a tension spring 15. The locking device can then be triggered by the cable pull 7. After the cable pull 7 has unlocked the locking hook 16, the catches 5 are pulled up by the tensioned tension spring 15, so that when the salvage lance is pulled back, the burning motor vehicle 12 is also pulled back.

In a further embodiment, the catches 5 can be held folded up by the tension spring 15. If the platform 3 is pushed under the burning motor vehicle 12, the catches 5 are folded down against the force of the tension spring 15. Only when the platform 3 comes out from under the burning motor vehicle 12 do the catches 5 fold back up and when the salvage lance 1 is pulled back, the catches 5 pull the burning motor vehicle 12 back with them.

Figure 10:
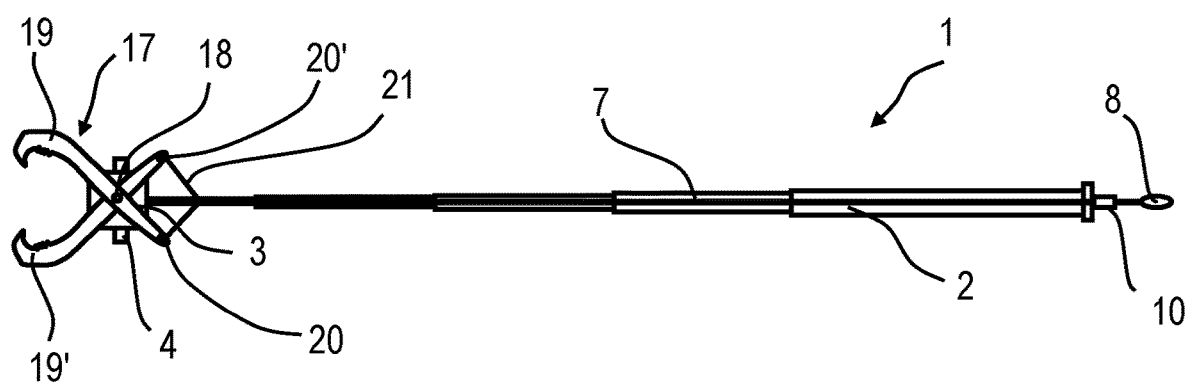
FIG. 10 shows an alternative embodiment of the catch.

FIG. 10 shows an alternative design of the catch 5 in a top view. Here grippers 17 are arranged at the tip of the platform 3, the joint 18 of which is fixed on the platform 3. The gripping jaws 19, 19' of the grippers 17 can bite, for example, on a wheel of the motor vehicle. The ends 20, 20' of the respective two-armed levers opposite the gripping jaws 19, 19' are connected to one another via an actuating cable 21. The cable pull 7 engages in the middle of the actuating cable.

If the actuating means 8 of the cable pull 7 is pulled, the levers pivot with the ends 20, 20' about the joint 18. At the same time, the gripping jaws 19, 19' are pivoted toward one another for clamping the motor vehicle 12 or for clamping parts of the motor vehicle 12. After the clamped connection to the motor vehicle 12 has been established, it can be pulled out of the danger zone by the device 1

In summary, it can be stated that this type of device 1 allows the firefighters to safely salvage the burning motor vehicle 12. The salvage lance can be positioned by the firefighters 13 at a large distance from the danger zone. The telescopic cylinder 2 is then extended so that the platform 3 is moved into the working area of the catches 5 in the area of the motor vehicle 12. There, the catches 5 mounted on the platform 3 are actuated by means of the cable pull 7. Then the device 1 can be pulled back together with the motor vehicle 12. Since the fire brigade always has water, the telescopes of the salvage lance 1 is preferably operated by applied water.

REFERENCE SIGN LIST

1 Device (salvage lance)
2 Telescopic cylinder
3 Platform
4 Rollers
5 Catches
6 Hinge
7 Cable pull
8 Actuating means
9 Carrying handles
10 Fitting
11 Towing eye
12 Motor vehicle
13 Firefighters
14 Hydraulic hose
15 Tension spring
16 Locking hook
17 Grippers
18 Joint
19 Gripping jaws
20 Ends
21 Operating cable

The invention claimed is:

1. A device (1) for salvaging a wrecked motor vehicle (12) from a danger zone, comprising:
   an extendable telescopic cylinder (2);
   a movable platform (3) with wheels or rollers (4) arranged at a tip of the extendable telescopic cylinder (2);
   a catch (5) that can be moved from a rest position into a locking position by remote control, the catch (5) being supported by the platform (3); and
   an actuating device for actuating the catch (5) arranged along the extendable telescopic cylinder (2), the actuating device being a cable pull (7) to which an actuating means (8) is attached,
   wherein the catch can be brought into the locking position at the wrecked motor vehicle (12) by the remote control so that the motor vehicle (12) is carried along when the device (1) is pulled back.

2. The device (1) according to claim 1,
   wherein the platform (3) is configured to be driven under the motor vehicle (12), and
   wherein the catch (5) is a pin which is connected to the platform (3) by a hinge (6) and configured to pivot from a horizontal rest position into an upright locking position.

3. The device (1) according to claim 1,
   further comprising a spring (16) arranged to move the catch (5) out of the rest position.

4. The device (1) according to claim 1,
   wherein a remote-controlled locking device (15) holds the catch (5) in the rest position or in the locking position.

5. The device (1) according to claim 1,
   wherein the catch (5) is a pair of grippers (17) or claws that can be moved by a joint (18) on the platform (3) from an open rest position to a closed locking position.

6. The device (1) according to claim 1,
   wherein the telescopic cylinder (2) is provided with handles (9) for transporting the device (1).

7. The device (1) according to claim 1,
   wherein the telescopic cylinder (2) has a fitting (10) by which a hydraulic hose (14) for supplying a hydraulic fluid can be connected.

8. The device (1) according to claim 1,
   further comprising a towing eye (11) attached at an end of the telescopic cylinder (2) for pulling back the device (1) and the motor vehicle (12) by a cable winch or a manual cable hoist.

9. The device (1) according to claim 7,
   further comprising a control at a rear handle end of the device (1) which determines a direction of flow of the hydraulic fluid.

* * * * *